(No Model.) 2 Sheets—Sheet 1.
A. G. MIDFORD.
APPARATUS FOR RAISING SUNKEN VESSELS.
No. 541,174. Patented June 18, 1895.
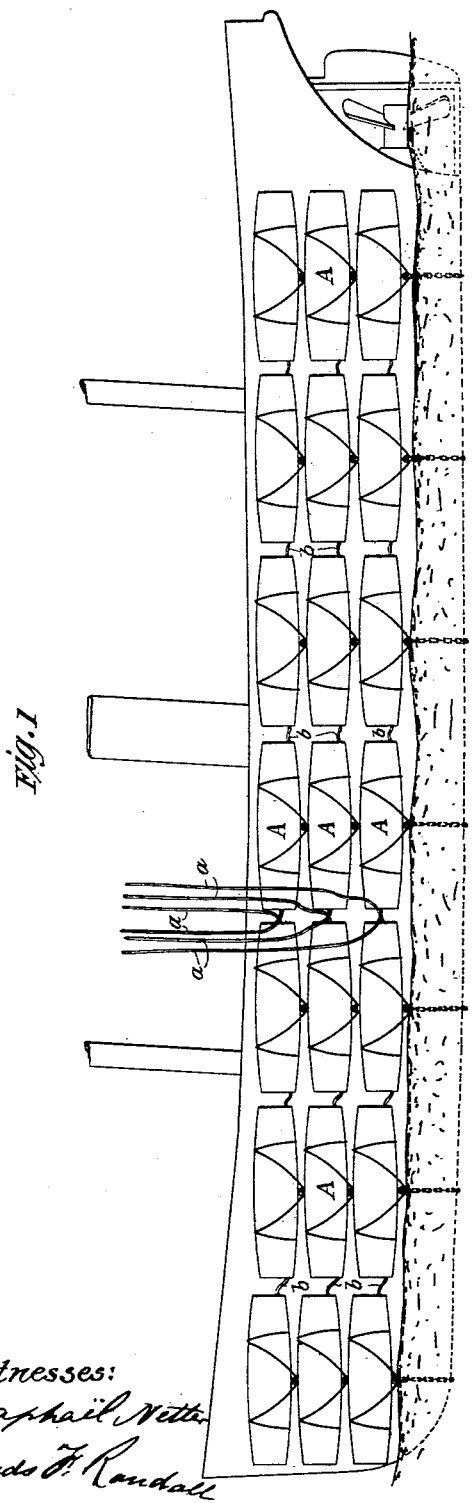
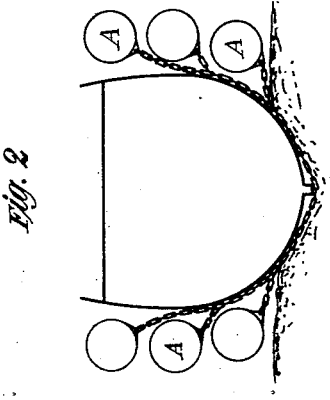
Witnesses:
Raphael Netter
Sands F. Randall
Inventor
Albert G. Midford
By Clarkson A. Collins
Attorney.

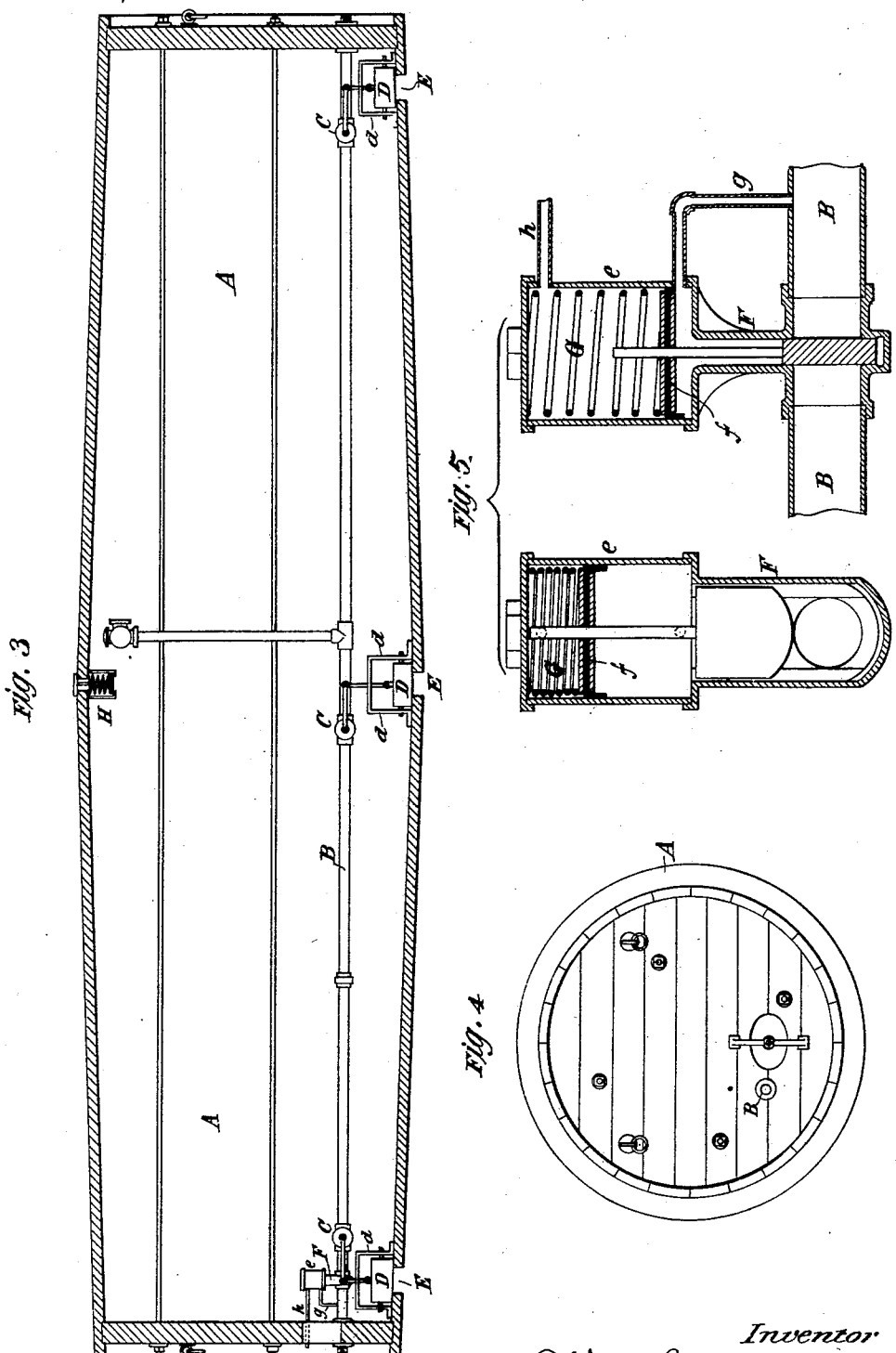

UNITED STATES PATENT OFFICE.

ALBERT G. MIDFORD, OF NEW YORK, N. Y.

APPARATUS FOR RAISING SUNKEN VESSELS.

SPECIFICATION forming part of Letters Patent No. 541,174, dated June 18, 1895.

Application filed June 13, 1894. Serial No. 514,383. (No model.)

*To all whom it may concern:*

Be it known that I, ALBERT G. MIDFORD, a subject of the Queen of Great Britain and Ireland, residing in the city of New York, in the county and State of New York, have invented certain new and useful Improvements in Apparatus for Raising Sunken Vessels, of which the following is a specification.

None of the methods heretofore employed for this purpose have proved wholly satisfactory or practicable under all circumstances. Thus the inflation with air of collapsible air tight vessels placed within the vessel's hull, can only be practiced where the hold of the vessel is comparatively empty. The drawing down of water tight caissons or vessels filled with air and attaching them to a sunken hull can only be accomplished with much difficulty and the pumping of water out of water tight caissons by a lifting pump, can only be useful at very limited depths.

The object of my improvements is to obviate the difficulties heretofore encountered and provide a simple means of accomplishing he desired result which shall be efficient and practicable under all ordinary circumstances. To this end I attach in any suitable manner to the sunken hull to be raised, a number of hollow vessels or caissons, filled with water. These are arranged in a tier or series of tiers along the sides of the vessel, those caissons which are fed from the same air pipe being upon the same level and they must be sufficient in number to buoy up the load to be raised or floated when emptied of the water contained in them. Air is then forced into these by means of any suitable air compressor driving out the contained water and filling the caissons with air until sufficient buoyancy to float the submerged hull is attained.

The invention will be best understood by reference to the accompanying drawings, in which—

Figure 1 shows a side view, and Fig. 2 a section, of the submerged hull of a sunken vessel with caissons attached thereto. Fig. 3 shows a longitudinal section, and Fig. 4 an end view, of one of the caissons with its valves and pipe connections; and Fig. 5 shows the details of a part of the apparatus.

A A A show the pneumatic caissons which are primarily filled with water and are arranged in tiers along the sides of the vessel to be raised, all the caissons which are fed from the same air pipes being on substantially the same level, as otherwise the air forced into the caissons will otherwise, seeking the point of least hydrostatic pressure, fill only the highest caisson, and are attached to chains passed under the hull of the vessel. The caissons are preferably of large size and may be constructed of wood or other suitable material. With each tier of caissons are connected one or more air supply pipes $a\ a$ which lead from a suitable air compressor carried on the wrecking vessel or tug. One air supply pipe may serve to supply air to all the caissons in each tier, the caissons being connected by pipes $b\ b$ passing from one to another, or the caissons in each tier may be divided into as many sections as desired with an air supply pipe to each section.

Within each caisson is an air pipe B to which the air supply pipes $a$ and the pipes $b$ leading from caisson to caisson are connected.

The pipe B is supplied within the caisson with valves C C C, which open into the caisson and are controlled by the floats D D D which work within the guides $d\ d$ and are adapted to be seated upon and close the water outlet ports E E E, and at the same time close the valves C C C when the caisson is emptied of water. The pipe B is also normally closed by the valve F which is located near the point at which the air from the compressor enters the pipe, and is closed by hydrostatic pressure, and by the spring G which is located in a box $e$ and bears against a piston head $f$ fitted to the box $e$. From the lower end of the box $e$ a pipe $g$ is connected with the pipe B at a point outside of the valve F and from the upper part of the box $e$ a pipe $h$ leads to the outside of the caisson. Each caisson is also supplied with a safety valve H in order to relieve any excess of air pressure within the caisson.

In order to raise a sunken vessel a suitable number of caissons being filled with water are sunk in proper positions around the hull and chains passing under the hull are attached to caissons on either side. When the caissons are suitably secured in position, the water contained in them is forced out by air pressure in the following manner: On operating the air compressor the air passes down the air supply pipe *a* to the caisson with which it is connected. Through the pipe *g* the air enters the box *e*, under the piston head *f* and forces up the piston head, driving out the water contained in the box *e* through the pipe *h* and opening the valve F. The air then enters the pipe B and passes out through the open valves C C C, into the caisson forcing out the water therein through the water exit ports E E E. As soon as the water is so far expelled from the caisson that the air pressure can act upon the floats D D D these are pressed downward closing the water exit ports E E E, and at the same time closing the valves C C C, and the air ceases to enter the first caisson and passes on through the connecting pipe to the next in series from which the water is in turn expelled in the same manner. In this way a large number of caissons can be emptied of water and filled with air in a very short time, and the hull will be floated by the buoyancy of the caissons as soon as the water is expelled from a sufficient number thereof.

In case of a cessation of the air supply from the compressor at any time, as by reason of stoppage of the compressor or a break in the air supply pipe, the air pressure is at once withdrawn from below the piston head *f* and the valve F is quickly closed by the force of the spring G, aided by the hydrostatic pressure and the air already forced into the caisson is thereby prevented from escaping.

The advantage of my invention will be readily apparent since it affords a practicable and simple means of raising sunken vessels however loaded, from any depth of water at which a diver can work.

I do not limit my invention to the precise details of apparatus herein described, since various modifications that will readily occur to those skilled in the art, may be used to the same end without departing from the nature of my invention.

What I do claim as new, and desire to secure by Letters Patent, is—

1. In a caisson the combination of a water exit port, a float adapted to close such port, an air pipe extending through such caisson and a valve in such pipe opening into the caisson and operated by such float, substantially as and for the purposes set forth.

2. In a caisson for raising sunken vessels, the combination with a main air pipe of a valve in such pipe, a spring operating to close such valve and located in a closed case, a piston-head in such case attached to the valve stem, a pipe from the main air pipe connecting with such case at a point on one side the piston head, and a pipe from the outside of the caisson connecting with such case at a point on the other side of the piston-head substantially as and for the purposes set forth.

3. In a caisson for raising sunken vessels the combination of a series of normally open water exit ports located respectively near the center and ends of such caissons, floats operating to close such ports, an air pipe passing through the caisson and normally open valves in such pipe, and means operated by the closing of the ports to close such valves, substantially as and for the purposes set forth.

4. In a caisson for raising sunken vessels the combination with a main air pipe, B, extending through such caisson of a normally closed valve, F, in such pipe, and means operated by the pressure of air entering the pipe for opening such valve, substantially as and for the purposes set forth.

5. In a caisson for raising sunken vessels the combination of a main air pipe leading to the caisson, a normally closed valve in such pipe, a closed case, a piston head in such case attached to the stem of such valve, a pipe from a point in the main air pipe outside of the valve connected with such case on one side of the piston head, and a pipe from the outside of the caisson connecting with such case on the other side of the piston head, substantially as and for the purposes set forth.

In testimony whereof I have hereunto subscribed my name this 5th day of June, A. D. 1894.

ALBERT G. MIDFORD.

Witnesses:
F. A. PHILLIPS,
W. S. WAGSTAFF.